United States Patent [19]

Dybwad

[11] Patent Number: 4,654,530
[45] Date of Patent: Mar. 31, 1987

[54] REFRACTIVELY SCANNED INTERFEROMETER

[76] Inventor: Jens P. Dybwad, 513 Tumbling Hawk, Acton, Mass. 01718

[21] Appl. No.: 831,078

[22] Filed: Feb. 19, 1986

Related U.S. Application Data

[63] Continuation of Ser. No. 547,059, Oct. 31, 1983.

[51] Int. Cl.$^4$ .............................................. G01J 3/45
[52] U.S. Cl. .................................... 250/347; 356/346
[58] Field of Search ................. 356/346; 250/347, 353

[56] References Cited

U.S. PATENT DOCUMENTS

| 4,165,938 | 8/1979 | Doyle | 356/346 |
| 4,265,540 | 5/1981 | Doyle | 356/346 |
| 4,286,877 | 9/1981 | Clark | 356/346 |
| 4,329,055 | 5/1982 | Schaefer et al. | 356/346 |

FOREIGN PATENT DOCUMENTS 2906015 8/1979 Fed. Rep. of Germany ...... 356/346

Primary Examiner—Vincent P. McGraw
Assistant Examiner—S. A. Turner
Attorney, Agent, or Firm—Sherman H. Goldman

[57] ABSTRACT

An interferometer/spectroradiometer that uses a beamsplitter means for dividing an input beam into two separate beams and presents the resultant beams to a rotary refractive window from symmetrically oriented optical elements such that the optical path differences through the refractive window as it rotates are additive and non-linearities are subtracted. The beams are returned through the refractive window to the beamsplitter for dividing the input beam, where fringes are generated for application to appropriate detectors. The detector output is applied to Fourier transform computer equipment for digitizing and processing for presentation on a spectrum display device.

7 Claims, 2 Drawing Figures

REFRACTIVELY SCANNED INTERFEROMETER

This application is a continuation of my application Ser. No. 547,059 of 31 Oct., 1983.

BACKGROUND OF THE INVENTION

This invention relates generally to interferometers and more particularly to a refractively scanned interferometer capable of utilization as a Fourier transform interferometer/spectroradiometer.

One of the most common arrangements for performing the interferometric function is known as the Michelson Configuration of which there are many derivatives. These optical interferometers use light interference in spectroscopy and have two beams of light in separate optical paths that are directed toward a common point at which the beams meet and form interference fringes.

To achieve the ends of increasing the scan speed and resolving power for low level light intensities while maintaining excellent wave length accuracy with a minimum of stray radiant energy problems, the use of Fourier transform spectroscopy is indicated with Michelson type apparatus. Devices with Fourier transform capability, when used for radiometry, i.e., absolute intensity measurements, generally involve the detection and measurement of radiant electro-magnetic energy in the optical spectrum; therefore, the response of detectors, appropriate for the particular region of the spectrum to be investigated, can be speedily converted into a conventional spectrum with a Fourier transform computer system.

Accomplishment of the scanning for Fourier transform interferometer/spectroradiometers with the Michelson type apparatus most often included reflective scanning. The equipment utilizing reflective scanning is usually large, heavy, expensive laboratory apparatus which is not suitable for many field uses. The critical dimensional relationship between the elements of the apparatus using reflective scanning is the factor predominantly responsible for the limitations enumerated. For example, a wobble of the linear reciprocation of the reflective scanning member causes wave front misalignment which, when it exceeds about one arc-second, causes the disappearance of useful fringes.

Refractive scanning has been suggested to overcome the aforementioned disadvantages of reflective scanning. One mode involved a linearly scanned, wedge-shaped window to create a differential in optical path length, the varying thickness of the wedge-shape resulting in a proportional optical retardation. The linear reciprocating wedge scheme introduces design and manufacturing complications not present with rotary systems. Additionally, the linear reciprocation concept has been found to be sensitive to external forces from a hostile environment.

The taper of the wedge results in an increase in the cost of manufacture over that of a flat plate. It should be noted that the reciprocating action of the wedge allows for only two spectra per reciprocation, which limits the speed of data acquisition.

Another concept, discarded because of its disadvantages, involves the use of a rotatable refractive plate for scanning in one arm or optical path of a Michelson type apparatus. The disadvantages are the added expense of a compensator window for optical balancing of the other arm or the optical path which does not have the scanning plate, and the large non-linearities introduced by the optical retardation vs. rotation angle which require expensive, complex electronics and a complex control of the drive in order to compensate.

Neither the prior art devices nor the contemplated solutions has allowed for the production of a small, portable, inexpensive device which is accurate even though it is subjected to a hostile environment. Minimization of the non-linearities has thus far been an elusive goal unattainable by designs produced or suggested.

SUMMARY OF INVENTION

This invention comprises refractive scanning by means of the rotation of a single, flat, refractive plate in an interferometer/spectroradiometer wherein optical path differences are additive while non-linearities are subtracted.

Accordingly, is a primary object of this invention to provide an accurate, compact, portable, rugged, inexpensive interferometer/spectroradiometer arrangement which utilizes Fourier transform computer apparatus.

It is another object of this invention to provide an interferometer apparatus comprising an arrangement having a rotated refractive element which has both beams of a Michelson type apparatus transmitted therethrough to cause the optical path differences between the two beams to be additive while non-linearities of each beam are subtractive and, therefore, are minimized or nearly eliminated.

It is still another object of this invention to provide an interferometer/spectroradiometer having an association of elements which allows for a small refractive window which is dynamically balanced and has the capability of four spectra per revolution for improved speed of data acquisition.

It is a further object of this invention to provide an interferometer apparatus using a scanning drive means which does not require the same tolerances as drives of the prior art.

Another object of this invention involves the production of an interferometer/spectroradiometer which involves the utilization of a rotatable refractive window of constant rotative speed that allows for the elimination of the introduction of a laser reference interferometer for certain low cost applications, and which is capable of having the speed varied, for example, by minor servo control corrections to the drive means, where very high precision is required to eliminate any non-linearities not cancelled by the refractive window.

Still another object of this invention is to provide a refractively scanned, Fourier transform interferometer/spectroradiometer that is easy and economical to produce of standard, currently available materials that lend themselves to conventional mass production manufacturing techniques.

These and other advantages, features and objects will become more apparent from the following description taken in connection with the illustrative embodiment in the accompanying drawings. dr

BRIEF DESCRIPTION OF THE DRAWINGS

An interferometer/spectroradiometer in accordance with the present invention will be described infra, with reference to the accompanying drawings, which are not drawn to scale, of which

DESCRIPTION OF THE PREFERRED EMBODIMENT

Figure 1:
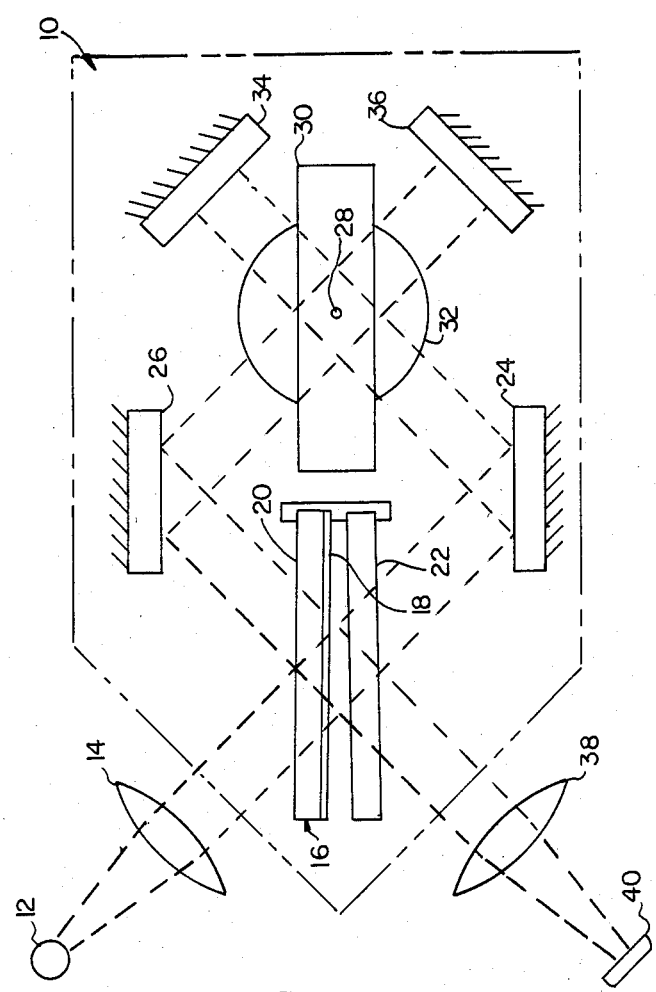
FIG. 1 is a schematic representation of the rapid scanning, optical interferometer of this invention.

Referring to FIG. 1 there is shown a rapid scanning, optical interferometer (10), which has an input beam directed from a source (12), through collimating optics (14), into the interferometer. The beam is directed, as shown, to an amplitude dividing beamsplitter (16), which comprises a partially reflective coating (18) on a substrate (20). The coating allows close to 50% of the original beam to pass therethrough, while the remainder is reflected.

The invention will be described relative to a system designed for the infrared spectrum since Fourier transform apparatus has been particular ubiquitous with that application. It should be noted, however, that this invention is not limited to any particular spectral region. Appropriate selection of materials responsive to particular wave lengths desired is considered to be well within the purview of one skilled in the art.

Although the IR beam is first directed to beamsplitter window (16), as illustrated, and thence part of the split beam is directed through a compensator window (22), the reverse orientation would be an alternative, i.e., having the collimated input beam first directed through compensator window (22) to beamsplitter window (16). Since, by way of example, the infrared spectrum has been selected, the material for the substrate (20) of beamsplitter (16) and that of compensator (22) would be the same and could be of any conventionally known material that would allow for transmission of the appropriate wave length corresponding to the input infrared beam such as KBr, KCl, $CaF_2$, etc. The partially reflective coating (18) of beamsplitter (16) for infrared applications could be of Germanium. The compensator window (22) is spaced a fraction of a millimeter or a few thousandths of an inch from beamsplitter window (16) and is oriented very slightly out of parallelism to allow for escape of spurious reflections while the compensator (22) provides for correction of dispersions. The compensator window (22) could be eliminated if a foil type beamsplitter were used. Also, the beamsplitter (16) and compensator (22) could be fixedly mounted as an assembly as schematically represented.

The split beam has one portion transmitted through beamsplitter window (16) to a conventional, fixed first surface mirror (24) while the portion reflected from partial reflector surface (18) is directed to a symmetrically disposed mirror (26) which is identical to mirror (24). Mirrors (24) and (26) direct their respective infrared beams toward rotating refractive window (30) which is suitably disposed to receive the beams. Refractive window (30) comprises a plate, i.e., a smooth, flat, thin piece of material which can be of the same composition as that of the substrate (20) of beamsplitter (16), wherein the opposite faces, defined by the plate edge surfaces, at which the beams are received and from which they are transmitted are in parallelism.

Rotative refractive window (30) is driven by a motor (32), usually of constant speed, about an axis (28), substantially at the intersection of the beams, with a minimum of perturbations that could introduce spectral errors. For certain applications requiring extreme precision, the speed of motor (32) could be varied with only a slight non-linearity to compensate for minor irregularities. These irregularities amount to only 1 to 2 percent error as opposed to large errors of the prior art and proposals specified in the Background of the Invention section of this specification. At the same time the optical path differences in the two arms of the interferometer, because of the rotation of refractive window (30), are additive and, therefore, increase.

It can be shown by mathematical analysis that by having both signals or beams go through the same refractive scanning window (30) the geometry causes any non-linearities of one beam, which tends to be increasing, to be compensated by a reverse or decreasing trend of the other beam. The result is a near cancellation of any non-linearities. The rotative mounting of refractive window (30) makes it relatively insensitive to hostile forces. It is easily balanced dynamically and need not be held to the same tolerances as the prior art devices.

Each of the IR beams from mirrors (24) and (26) that have been directed through refractive, rotating window (30) are reflected by first surface, fixed mirrors (34) and (36), respectively. These last mentioned mirrors are aligned to interferometer tolerance to redirect the IR beams which impinge thereon back on the same paths from which they emanated. The beam from fixed, first surface mirror (36) retraces its path through rotative refractive window (30) to fixed first surface mirror (26) to beamsplitter (16). The beam from fixed, first surface mirror (34) is directed back through window (30) to mirror (24) and is thence directed through compensator window (22) to beamsplitter (16). Both retrace beams which have arrived at beamsplitter are evenly divided or split and those portions that are directed toward the input elements (14) and (12) are discarded while those portions that meet at beamsplitter (16), that will be directed toward the output comprising focusing lense (38) and infrared detectors (40), generate fringes which after travel through the compensator window (22) become the input for a spectroradiometer system.

Figure 2:
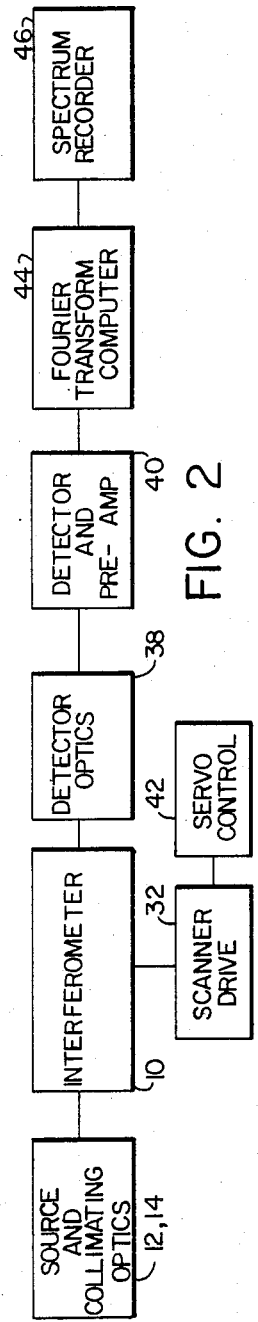
FIG. 2 is a block diagram of the interferometer/spectroradiometer system.

FIG. 2 illustrates the block diagram of the interferometer/spectroradiometer system in which the rapid scan interferometer (10) of FIG. 1 is incorporated with an IR input, by way of example. As was described relative to FIG. 1, an IR source (12) with collimating optics (14) presents its beam to the rapid scanning interferometer (10), which is also known as an interferometer modulator or optical head. A constant speed scanning drive motor (32) is connected to operate the rotating refractive window (30) of rapid scanning interferometer (10), and, if very high precision is required, may include a servo control (42) for the drive motor (32) to adjust for any residual non-linearities.

The output from the interferometer (10) would be applied through conventional detector optics (38) to a detector and preamplifier (40), which for IR applications could use mercury cadmium telluride as the detector material. A Fourier transform computer (44) digitizes and processes the output from the detector (40) and converts it to a spectrum display which is presented on a recorder (46). Except for the interferometer (10), the remaining items forming this system are standard, currently available components.

The system described utilizes a small, rotated, refractive window which enables a reduction in size of the entire apparatus, while at the same time, because the optical system uses the window with both beams of a Michelson type system, samples the spectrum four times for each window revolution, thereby providing speedy data acquisition. Included as additional characteristics are the additive effect for optical path difference and a subtractive effect for non-linearities which also enable a reduction in size as well as a minimization of the use of simple controls to obtain non-constant speed rotation when complete elimination of irregularities is required.

Although the invention has been illustrated in the accompanying drawings and described in the foregoing specification, in terms of a preferred embodiment thereof, the invention is not limited to this embodiment. It will be apparent to those skilled in this art that certain changes, modifications, and substitutions can be made without departing from the true spirit and scope of the appended claims.

I claim:

1. An interferometer for use in infrared spectroscopy comprising,
   - a beamsplitter having a partially reflective coating on an optical, infrared transmitting substrate for receiving an infrared input beam and dividing it into two beams, one a transmitted beam and the other a reflected beam,
   - path defining optical means defining two separate optical paths, one for each of said two beams from said beamsplitter, such that said paths have a first intersection without any optical path length difference,
   - a refractive window capable of the reception and transmission therethrough of infrared beams without the inducement of significant reflections, said refractive window being oriented and adapted for rotation about an axis substantially at said first intersection of the paths of said two beams to produce a difference between the optical path lengths of said two beams while obtaining four spectra per revolution,
   - means for rotating said refractive window, and
   - receiving and redirecting optical means for receiving each of said two beams from said refractive window and redirecting each of said two beams toward said refractive window for their retransmission back along said two optical paths defined by said path defining optical means to said beamsplitter to generate optical fringes.

2. An interferometer as defined in claim 1, wherein said means for rotating said refractive window is a constant speed motor drive.

3. An interferometer as defined in claim 1, wherein said means for rotating said refractive window includes a programmed, servo controlled motor drive to provide a variable speed of rotation, to eliminate any residual non-linearities.

4. An interferometer as defined in claim 1, including a compensator window located in the path of the transmitted beam of said beamsplitter.

5. An interferometer as defined in claim 1, wherein the path defining optical means defining two separate optical paths comprises a pair of reflectors, each of which is located in optical alignment with respect to said beamsplitter to receive and reflect a separate one of said two beams.

6. An interferometer as defined in claim 1, wherein the receiving and redirecting optical means for receiving each of said two beams from said refractive window comprises a pair of mirrors, each optically aligned to receive a separate one of said two beams from said refractive window, and, to return its received beam back along its same path to said refractive window.

7. An interferometer as defined in claim 1, wherein the refractive window is a thin, flat plate with opposite faces in parallelism.

* * * * *